United States Patent [19]

Jones

[11] 4,272,208
[45] Jun. 9, 1981

[54] CONNECTOR DEVICE

[76] Inventor: Dixon J. Jones, Box 80023, Fairbanks, Ak. 99708

[21] Appl. No.: 146,252

[22] Filed: May 5, 1980

[51] Int. Cl.³ .............................................. F16B 7/00
[52] U.S. Cl. .................................. 403/396; 403/232.1
[58] Field of Search ................... 403/232.1, 400, 398, 403/399, 396, 392, 391, 397, 394, 390; 52/665, 702, 719

[56] References Cited

U.S. PATENT DOCUMENTS

| 1,986,528 | 1/1935 | Ranger | 52/719 |
| 4,195,942 | 4/1980 | Kestner | 403/391 X |

FOREIGN PATENT DOCUMENTS 1120609  4/1956  France ...................... 403/400

Primary Examiner—Andrew V. Kundrat
Attorney, Agent, or Firm—Ralph M. Faust

[57] ABSTRACT

A device for rigidly connecting two members of rectilinear cross section comprises a thin, unitary sheet shaped to the general form of the surface of a hexahedron having two parallel rectangular faces and four trapezoidal faces. The device has a pair of slots at right angles to each other and the members are received in the slots and secured to the surface forming the bottom of the slot in which each is received.

6 Claims, 10 Drawing Figures

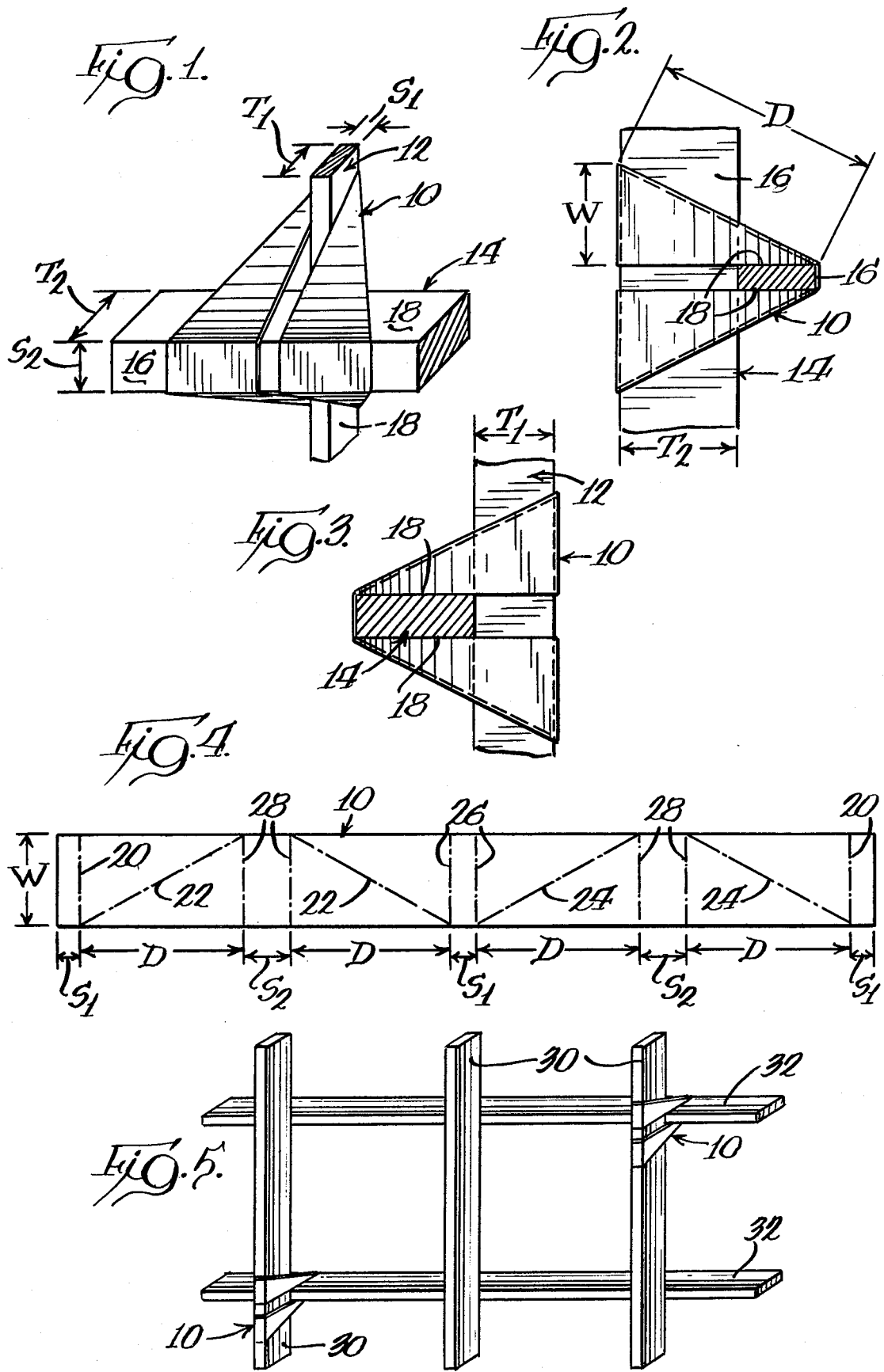

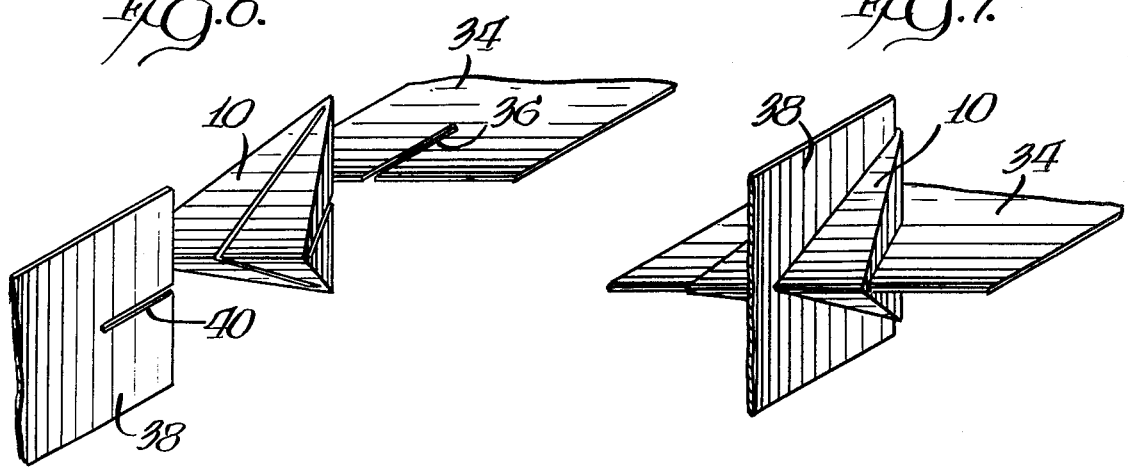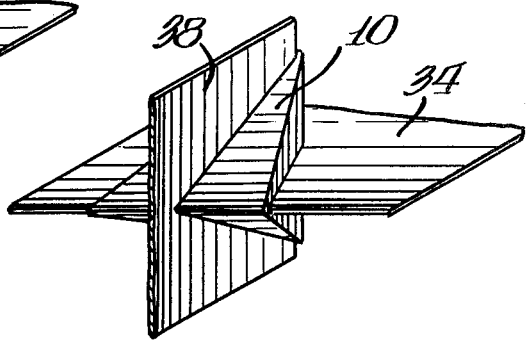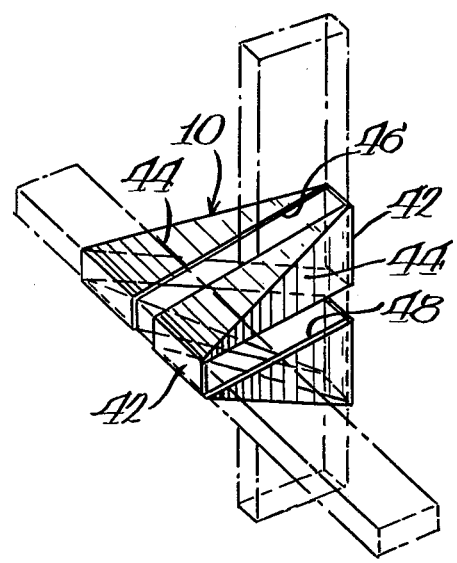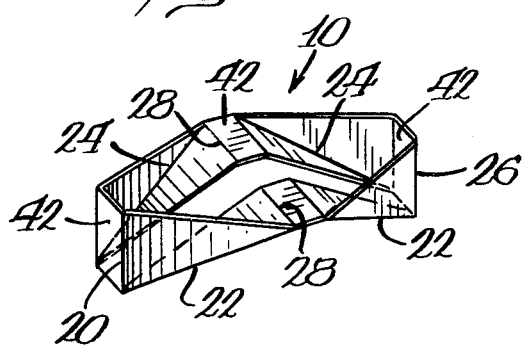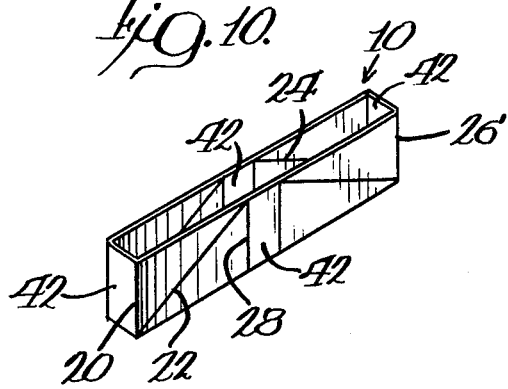

CONNECTOR DEVICE

BACKGROUND OF THE INVENTION

While there are many types of connectors on the market, almost all of them have been designed for only one specific purpose and for only one specific manner of use. This is particularly true of one-piece, or unitary, devices for connecting a pair of members having their longitudinal axes perpendicular to each other.

Such connectors, for example, have not found their way into the building construction industry wherein building beams, studs, stringers and the like are secured together by means of nails. In home construction, particularly in cold climates, conventional construction methods limit the space available for insulation because the studs must be nailed onto the stringers through their shortest dimension, commonly referred to as the thickness. For example, a wood 2"×4" is nailed through the shorter dimension when fastened to another member. In this age of energy conservation, it obviously is desirable to increase the thickness of the insulation. However, the maximum thickness is limited by wall thickness. With conventional construction methods, thicker walls to accommodate thicker insulation require more framing lumber. In some instances, a double wall has been utilized, thereby doubling the space available for insulating material but, at the same time, also doubling the cost of the basic structure of the building.

SUMMARY OF THE INVENTION

The connector device of the present invention obviates the foregoing difficulties by accommodating the simple connection of studs and stringers in edgewise relationship rather than side-to-side or side-to-edge relationship. The wall thickness is thereby increased to accept thicker insulation while using the same amount of lumber as in prior art constructions.

The connector device, while perhaps having its greatest utility in building construction, may be advantageously used to rigidly connect a pair of members of rectilinear cross-section, without regard to the size or relative cross-sectional dimensions of members to be connected. Accordingly, the device might be of a size to connect the framing structure of a home, or a smaller size to be used as an educational building toy on the order of the TINKER-TOY ® or ERECTOR ® construction toys.

Briefly, the connector comprises a thin, unitary, i.e., one-piece, elongated strip formed of a material which is stiff but bendable, such as sheet metal or plastic, for rigidly connecting a pair of members having rectilinear cross-sections, the connected members having their longitudinal axes perpendicular to each other. The members may be (1) in spaced relationship, in which case the connector will preferably be secured to one face of each of the members; (2) in overlapping relationship, as when connecting thin sheets; (3) in abutting relationship, in which case the connector may or may not be secured to the members depending on the joint strength desired. Further, the members may be connected face-to-face, edge-to-face, or edge-to-edge, depending on the particular application involved.

BRIEF DESCRIPTION OF THE DRAWINGS

FIG. 1 is a perspective view of the connector device as it would be utilized to rigidly interconnect two members having rectilinear cross-sections;

FIG. 2 is a top plan view of the device of FIG. 1;

FIG. 3 is a side elevational view of the device of FIG. 1;

FIG. 4 is a view of a thin, elongated strip from which the device may be formed;

FIG. 5 is a schematic perspective view of a wall section which may be constructed by utilizing the connector;

FIG. 6 is an expanded view of the connector and a pair of thin sheets to be secured together;

FIG. 7 is a perspective view of the assembled form of the connector and sheets of FIG. 6;

FIG. 8 is a perspective view similar to FIG. 1 except from a different angle of view and with the connected members shown in phantom;

FIG. 9 is a perspective view illustrating an alternate method of fabricating the connector; and FIG. 10 is a perspective view illustrating still another method of fabricating the connector.

DESCRIPTION OF THE PREFERRED EMBODIMENTS

Referring first to FIGS. 1-3, the connector, generally indicated at 10, is shown connecting a pair of members 12 and 14 having rectilinear cross-sections and being disposed with their longitudinal axes perpendicular to each other.

The members 12 and 14 each have an outer surface 16 and a pair of parallel side surfaces 18. The connector is bent or folded such that in its final form and connecting two rectilinear members, the outer surfaces 16 of each member is contacted by, and preferably secured to, a face of the sheet forming the connector, while the parallel side surfaces 18 are contacted by edges of the sheet forming the connector. The foregoing conditions are true regardless of the orientation of the members with regard to their two shorter dimensions. For example, in FIGS. 1-3, the members are positioned edge-to-edge with the shorter surfaces adjacent to each other, but not necessarily abutting. It is this relationship which, for example in a building wall, will provide the greatest wall thickness. On the other hand, the connector will function with the members in face-to-face relationship or in edge-to-face relationship.

The connector comprises a thin strip of rigid or semi-rigid material such as, for example, sheet metal, paper, cardboard, plastic, or the like, having the dimensions and characteristics as best seen in FIG. 4 in conjunction with FIGS. 1-3. The strip have twelve creases or fold lines designated by the numerals 20, 22, 24, 26 and 28. The fold lines may be merely formed in the strip during its fabrication or, in some instances, may be lines scribed or scored in the strip, or may be defined by a lesser thickness than the remainder of the strip.

In order to determine the preferred dimensions of the strip and the location of the fold lines, it may be assumed that:

W = width of strip, an arbitrary figure generally about half the sum of the thicknesses of the stock;
$T_1$ = thickness of one member;
$T_2$ = thickness of other member;
$S_1$ = width of one member;
$S_2$ = width of other member $$D_1 = \sqrt{(T_1 + T_2)^2 + W^2}$$

The strip is folded along the fold lines, with all folds being in the same direction, with the portions between the extreme outer ends and the adjacent fold lines 20 being placed one on top of the other and joined together, as by gluing, nailing, or the like, either before or after the device is fitted around the members.

It is seen, then, that the fold lines of the strip are in the sequence, from end-to-end, A B AA B AA B AA B A, wherein each letter A is a cross or fold line perpendicular to the longitudinal axis of the strip, and each letter B is a diagonal fold line interconnecting opposite ends of adjacent perpendicular fold lines. The strip may be supplied flat and bent or folded around the members to be joined or the strip may be produced in its final form with the two end segments either loose or joined, as desired. In the first instance, the bending or folding is facilitated by providing a decreased thickness of material at the fold lines. In the second instance, sheet metal breaks may be utilized to form the folds, with the folds 20 being first simultaneously made, followed by folds 22, folds 24, folds 26, and finally folds 28, it being understood that all folds bearing the same numeral in FIG. 4 are made simultaneously. It should be pointed out that 2"×4" and 2"×6" lumber have been interconnected by a connector comprising unscored 26-gauge galvanized sheet, with the loose ends nailed together and to the surface of the lumber engaged thereby.

FIG. 5 represents a portion of a wall section which might be easily fabricated using the connectors described herein. In FIG. 5, connectors 10 are shown interconnecting a double row of vertically disposed studs 30 and a row of horizontally disposed stringers 32, all of the connected members being in edge-to-edge relationship.

In FIGS. 6 and 7, a member 34, in the form of a thin, flat sheet, is provided with a slot 36 adapted to receive a second member 38 which is provided with a corresponding slot 40. An appropriate connector 10 is slipped over one of the flat sheets and the other flat sheet is inserted into the "slot" of the connector and into the slot of the first member to achieve the assembly shown in FIG. 7.

Although the connector thus far has been described as a flat strip formed in a particular manner to embrace two members of rectilinear cross-section disposed with their longitudinal axes perpendicular to each other, it will be seen, particularly from FIGS. 1 and 8, that the device, in assembly, has the general shape of the surface of a hexahedron having two parallel rectangular faces 42 and four trapezoidal faces 44, as shown in FIG. 8. The rectangular faces are oriented with their longitudinal axes perpendicular to each other. The hexahedron has a pair of slots 46 and 48, the edges of each slot being equidistant from and lying on either side of one of the two planes of symmetry of the hexahedron. The ends or bottoms of each slot terminate at the shorter edges of a rectangular face 42 which, in effect, forms the end closure of the respective slot. The width of each rectangular face 42 and of each slot 46 and 48 is such as to accommodate one of the connected members with the edges of the slot bearing on opposite surfaces of the member and the rectangular surface at the base of the slot bearing against a third or outer surface of the respective member. For additional rigidity, the connector preferably is secured to the members at the rectangular faces. It will be noted also that the non-parallel edges of the trapezoidal faces are equal in length, each of the shorter of the parallel edges of the trapezoidal faces comprises one short edge of one rectangular face; and each of the longer of the parallel edges of the trapezoidal faces comprises one long edge of the opposite rectangular face.

The connector defined as having the general form of the surface of a hexahedron, as best seen in FIGS. 1 and 8, can be formed from, and can be unfolded back into, the strip of FIG. 4; however it could also be fabricated, for example, from molded plastic. FIGS. 8 and 9 show two possible injection-molded connectors. In each instance, the various fold lines are molded so as to have a thinner section than the body of the connector so that, in effect, a foldable hinge is created at each fold line. If desired, such molded connectors may be slit at one corner to permit the unfolding thereof into a flat strip to facilitate packing and shipping and also to facilitate a connecting operation in the field.

In summary, the one-piece connector described herein may be utilized to interconnect any pair of members of rectilinear cross-section with the longitudinal axes thereof perpendicular, and with the members being face-to-face, face-to-edge, or edge-to-edge. The connector can be made large enough to accommodate building lumber or small enough to be used as a construction-type toy.

Thus, while certain embodiments of the invention, preferred for a particular purpose, have been illustrated and described herein, it is to be understood that various modifications may be made therein without departing from the scope of the invention, as defined by the appended claims.

I claim:

1. A device for connecting a pair of members of rectangular cross-section having their longitudinal axes perpendicular to each other, each member having an outer surface and a pair of parallel side surfaces, said device comprising a unitary thin sheet formed from an elongated rigid or semi-rigid flat strip of bendable material having twelve fold lines in the sequence, from end to end, defined by (A B AA B AA B AA B A) wherein each letter A is a cross fold line perpendicular to the longitudinal axis of the strip, and each letter B is a diagonal fold line interconnecting opposite ends of adjacent perpendicular fold lines, said strip being folded such that, when connecting said pair of members, said outer surfaces of each member are contacted and engaged by a face of said sheet, and said parallel side surfaces of each member are contacted and engaged by edges of said sheet.

2. A device according to claim 1, wherein the thickness of the strip along the fold lines is less than the thickness of the remainder of the strip so as to facilitate bending of the strip into its final form.

3. A device according to claim 1, wherein a pair of cross fold lines are spaced from the ends of the strip by a distance equal to the thickness of one of said members, a second pair of cross fold lines centrally of the strip are spaced from each other by a distance equal to the thickness of said one member, and the remaining two pairs of cross fold lines are spaced from each other by a distance equal to the thickness of the other of said members.

4. A device for connecting a pair of members of rectangular cross-section having their longitudinal axes perpendicular to each other, each member having an outer surface and a pair of parallel side surfaces, said device comprising a unitary thin sheet formed into the general shape of the surface of a hexahedron having two parallel rectangular faces and four trapezoidal faces, the rectangular faces being oriented with their longitudinal axes perpendicular to each other; a first slot through one of said rectangular faces and one pair of trapezoidal faces, said first slot being perpendicular to the longitudinal axis of said one face and extending to and having the width of the other of said rectangular faces; a second slot through the other of said rectangular faces and through the other pair of trapezoidal faces, said second slot being perpendicular to the longitudinal axis of said other face and extending to and having the width of said one rectangular face; each of said connected members being received in a respective slot with its outer surface engaged by and secured to the rectangular face at the bottom of the slot, and its parallel side surfaces contacted and engaged by edges of said sheet.

5. A device for rigidly connecting two members of rectilinear cross-section, the device comprising a thin sheet having the general form of the surface of a hexahedron having two parallel rectangular faces and four trapezoidal faces; the rectangular faces being oriented with their longitudinal axes perpendicular to each other; a pair of slots in the surfaces of the hexahedron, the edges of each slot being equi-distant from and lying on either side of one of the two planes of symmetry of the hexahedron; the ends of each slot terminating at the shorter edges of one rectangular face; the width of one slot and the width of the rectangular face at its base being such as to snugly accommodate one member, the edges of the slot bearing on opposite faces of said one member, a third face of said one member bearing on and being affixed to the rectangular face at the base of said one slot; the width of the other slot and the width of the rectangular face at its base being such as to snugly accommodate the other member, the edges of said other slot bearing on opposite faces of said other member, a third face of said other member bearing on and being affixed to the rectangular face at the base of said other slot.

6. A device according to claim 5, wherein the non-parallel edges of the trapezoidal faces are equal in length, each of the shorter of the parallel edges of the trapezoidal faces comprises one short edge of one rectangular face, and each of the longer of the parallel edges of the trapezoidal faces comprises one long edge of the opposite rectangular face.

* * * * *